United States Patent [19]

Klimeck et al.

[11] Patent Number: 4,813,747

[45] Date of Patent: Mar. 21, 1989

[54] RACK ASSEMBLY FOR ADVANCING A WINNING MACHINE

[75] Inventors: Hugo Klimeck, Velbert; Volker Knorr, Sprockhovel; Gerhard Wilken, Bochum, all of Fed. Rep. of Germany

[73] Assignee: Gebr. Eickhoff Maschinenfabrik u. Eisengiesserei mbH, Bochum, Fed. Rep. of Germany

[21] Appl. No.: 92,767

[22] Filed: Sep. 2, 1987

[30] Foreign Application Priority Data

Sep. 23, 1986 [DE] Fed. Rep. of Germany ....... 3632301

[51] Int. Cl.[4] .............................................. E21C 29/00
[52] U.S. Cl. ..................................... 299/43; 105/29.1; 198/735
[58] Field of Search ........................ 299/34, 18, 43, 42; 198/735, 861.1; 105/29.1

[56] References Cited

U.S. PATENT DOCUMENTS 4,560,059 12/1985 Braun et al. ......................... 198/735
4,607,890 8/1986 Merten et al. .................. 198/735 X

FOREIGN PATENT DOCUMENTS 1044708 11/1958 Fed. Rep. of Germany ...... 198/735
2224478 4/1973 Fed. Rep. of Germany .
3407152 8/1985 Fed. Rep. of Germany ...... 198/735
76380 11/1954 Netherlands ........................ 198/735
501156 7/1977 U.S.S.R. ................................. 299/43
0693003 10/1979 U.S.S.R. ................................. 299/43

Primary Examiner—Stephen J. Novosad
Assistant Examiner—David J. Bagnell
Attorney, Agent, or Firm—Clifford A. Poff; Thomas H. Murray

[57] ABSTRACT

A rack assembly for allowing movement of a winning machine utilized in underground, long-wall mining operations. The rack assembly is comprised of a plurality of rack sections positioned end-to-end and suitable for attachment to trough sections of a face conveyor. The rack sections correspond in a one to one relationship to the trough sections and have lengths slightly greater than the associated trough sections. Toggles connect adjacent rack sections and maintain the adjacent rack sections such that end faces of the rack sections are maintained contiguous to one another, preventing relative longitudinal movement between the adjacent rack sections. The toggle, however, allows limited, relative vertical and horizontal movement between adjacent rack sections to allow positioning of the rack sections along a mine floor.

9 Claims, 3 Drawing Sheets

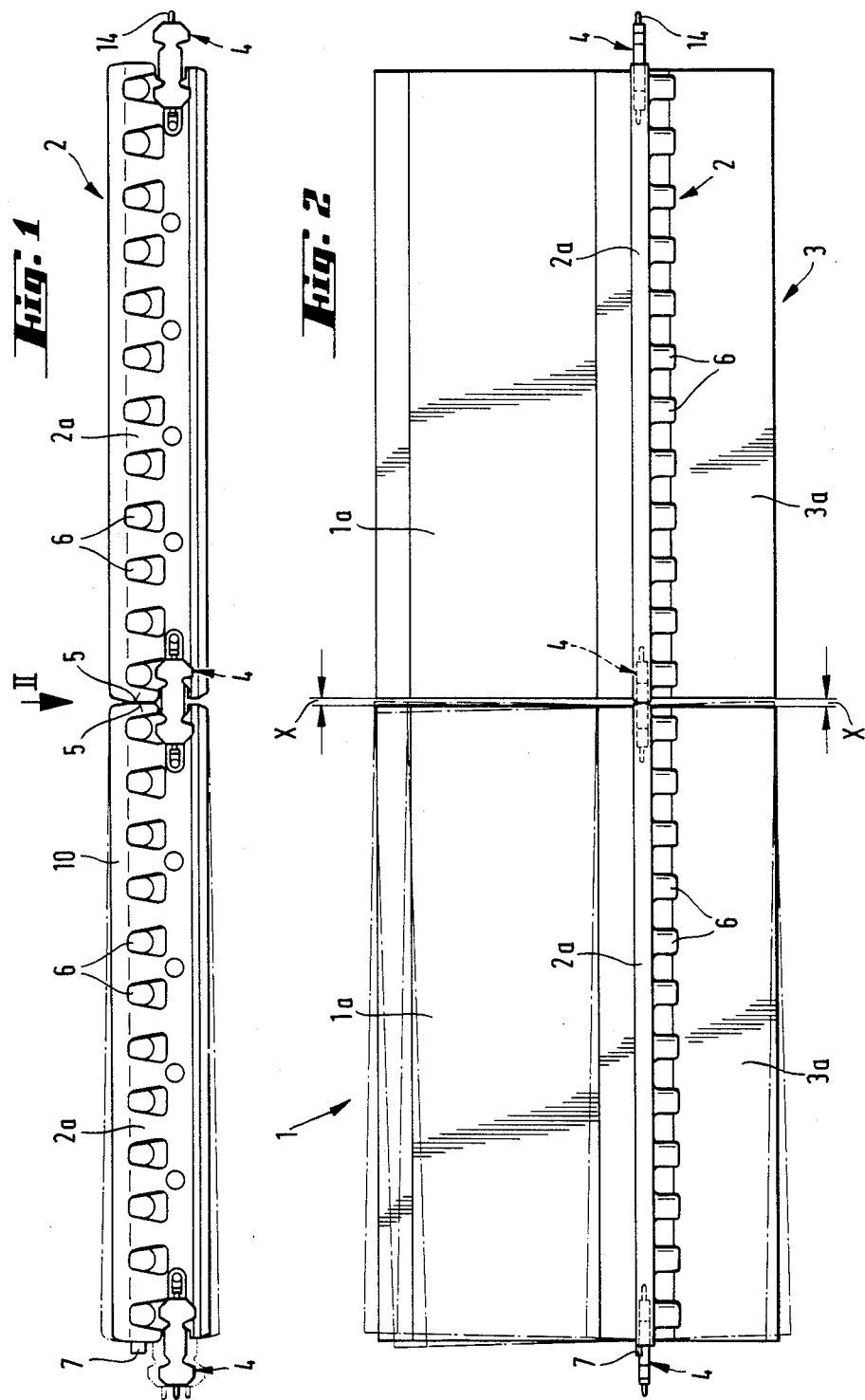

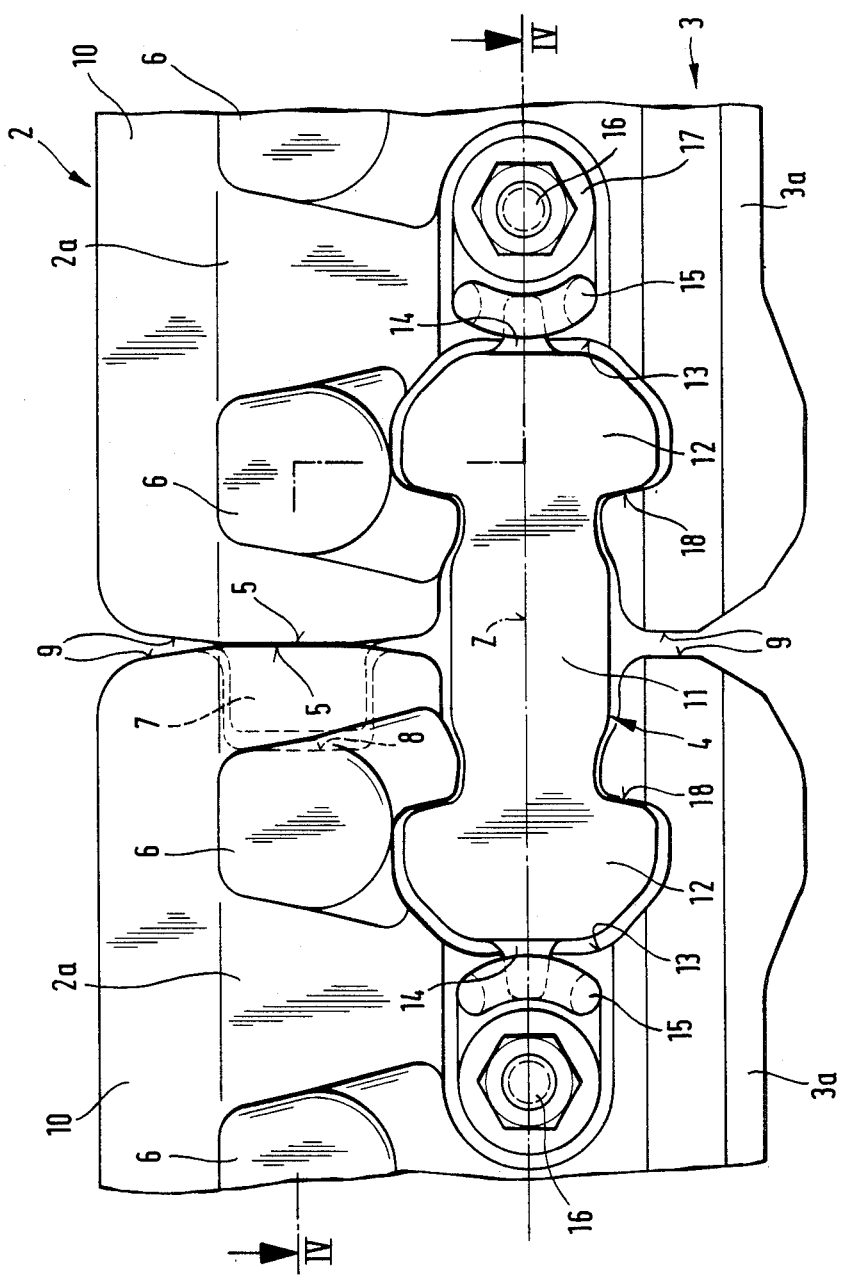

RACK ASSEMBLY FOR ADVANCING A WINNING MACHINE

BACKGROUND OF THE INVENTION

1. Field of the Invention:

The present invention relates generally to mining apparatus, and, more particularly, to a rack assembly for advancing a winning machine used in underground mining.

2. Description of the Prior Art:

Conventional long wall mining procedures utilizing drum cutter mining machines to perform the winning operations require the assembly of a suitable surface to allow the mining machine to advance along the length of the mine wall. Rack assemblies have been developed and are well known in the art which operate to guide and to allow the advancement of the drum cutter mining machine along a mine wall.

A rack assembly is typically comprised of a plurality of discrete rack sections connected theretogether in order to allow the assembly to conform to the contour of the mine floor. One such example of a rack assembly is disclosed is West German Pat. No. DE-OS 2,224,478 which discloses a pin-toothed rack assembly. The discrete rack sections of the rack assembly disclosed therein are connected by means of ball joints connecting adjacent rack sections. Plates, links, or the like, are also utilized to interconnect sections of the support structure supporting the rack sections. These links or plates limit the relative vertical movement of the different sections of the support structure and the face conveyor. The links or plates further function to reduce the load exerted upon the ball joints which connect the adjacent rack sections, and, further, protect the ball joints from being damaged due to excessive force loads. The ball joints connecting the adjacent rack sections further function to insure that the pitch of the rack pins which meshingly engage with the drum cutter mining machine does not vary between adjacent rack sections.

Drum cutter mining machines are large, heavy machines, and movement of the mining machines along the rack assembly exerts large amounts of force upon the rack assembly. Additional force is exerted upon the rack assembly when the mining machine advances through hard seam zones. In such instances, the forces required to advance the machine often exceeds 550 kilonewtons (kN). Each individual rack section, and, additionally, each element connecting the discrete rack sections, must be capable of withstanding such forces. The ball joints such as those disclosed by West German Pat. No. DEOS 2,224,478 are incapable of repeatedly withstanding such force. To increase the size of such ball joints to ensure that no damage is sustained from forces of this magnitude, would require a ball joint of such a large size, that the use of such would be prohibited. An improved connecting means is therefore required in order to prevent damage to the rack assembly exerted during winning operations.

It is therefore the object of the present invention to provide a connecting means to connect discrete rack sections to form a rack assembly that is not susceptible to damage caused by the forces exerted during operation of a winning machine.

It is a further object of the present invention to provide a rack assembly which allows limited relative horizontal movement of discrete trough sections positioned beneath the rack sections.

It is a still further object of the present invention to provide a rack assembly which maintains individual pins on adjacent rack sections at a constant pitch even when high force loads of a winning machine are exerted thereupon.

SUMMARY OF THE PRESENT INVENTION

In accordance with the present invention, a rack assembly for connecting to side walls of the face conveyor to allow movement of a winning machine therealong is disclosed. The rack assembly includes a plurality of rack sections positioned end-to-end and corresponding in number in a one to one relationship to trough sections of the face conveyor. Each of the rack sections also includes a series of, spaced-apart, transversely extending rack pins positioned along the length of each rack section. In the preferred embodiment, the length of each of the rack sections is greater than the length of the trough sections associated therewith, thereby allowing each rack section of the rack assembly to extend beyond the ends of the associated trough section, to thereby maintain adjacent ones of trough sections at a predetermined spacing. End faces at the opposite ends of the rack sections may further include bearing surfaces located in the plane of the rack pins, to allow the bearing surfaces of adjacent rack sections to bear continuously upon one another. The end faces of the rack sections may further includes alternating end-face projections and end-face recesses to allow toothing engagement between contiguous end faces.

The rack assembly further includes a connecting means for connecting adjacent rack sections such that end faces of the adjacent rack sections are maintained contiguous to one another so as to prevent relative longitudinal movement between the adjacent rack sections while permitting a limited vertical and horizontal movement between the sections. Preferably, the connecting means is comprised of toggles having a spindle portion separating enlarged end portions at opposite ends of the toggles. The enlarged end portions are positioned within cavities of the rack sections and held in place to thereby connect adjacent rack sections. By suitable determinating of the dimensions of the cavities in the rack sections, a limited vertical flexibility of the toggles may be allowed, and longitudinal movement of the toggles may be prevented. In order to increase the strength of the toggles, the spindle portion of the toggles may further include longitudinal central portions of increased diameters.

BRIEF DESCRIPTION OF THE DRAWINGS

The present invention may be better understood when read in light of the accompanying drawings in which:

FIG. 1 is a side, elevational view of the rack assembly of the present invention illustrating two discrete rack sections of the rack assembly connected by a toggle;

FIG. 2 is a plan view of the rack sections of FIG. 1, further illustrating two discrete trough sections of a face conveyor;

FIG. 3 is an enlarged, side, elevational view of the toggle and of the end faces of two adjacent rack sections.

DESCRIPTION OF THE PREFERRED EMBODIMENT

Figure 4:
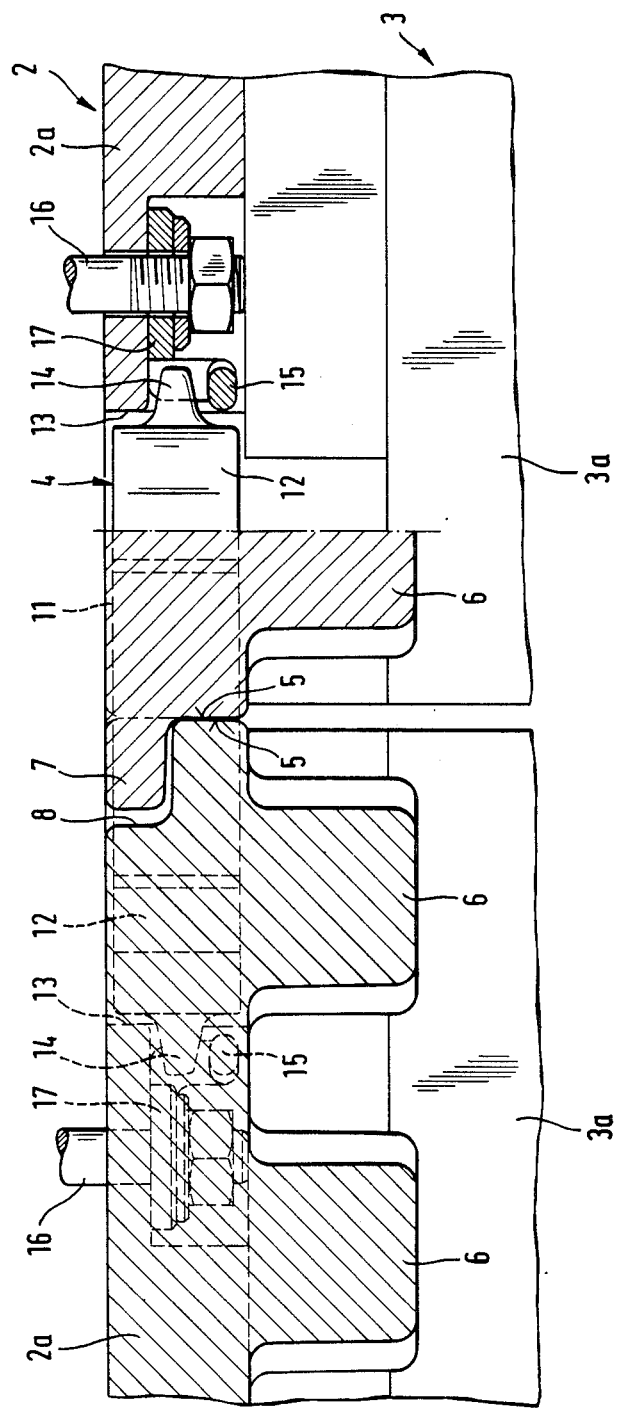
FIG. 4 is a sectional view taken along line IV—IV of FIG. 3.

Referring now to the side, elevational view of FIG. 1 and the plan view of FIG. 2, there is illustrated a face conveyor 1 comprised of discrete trough sections 1A. Positioned on first faces of each of the discrete trough sections 1A is a pin-toothed rack section 2A forming a rack assembly 2. Running along a mine floor in a direction parallel to that of the discrete trough sections 1A and pin-toothed rack segments 2A are machine track segments 3A which form a machine track 3. The face conveyor 1, rack assembly 2 and machine track 3 are comprised of a plurality of sections 1A, 2A, and 3A, respectively, along the entire length of the mine wall.

As illustrated in the plan view of FIG. 2, the length of individual rack sections 2A is slightly greater than the length of the associated trough sections 1A, thereby causing the individual rack sections 2A to extend a slight distance beyond the faces of trough sections 1A at each end thereof. Adjacent rack sections 2A are connected by toggles 4 wherein each toggle 4 bridges two racks sections 2A. The toggles 4 rigidly hold the rack sections 2A apart. Because each rack section 2A is fixed to the face of an associated trough conveyor section 1A, and because the length of each discrete rack section 2A is slightly greater than the associated trough section 1A, adjacent trough sections 1A are spaced apart by a distance X. The magnitude of X, the separation distance between adjacent trough sections 1A is predetermined to allow limited, relative horizontal flexing of adjacent sections 1A as illustrated by the cross-hatched lines of FIG. 2.

Adjacent rack sections 2A engage with one another only at opposing end faces of the adjacent rack sections 2A. Each end face of each rack section contains a bearing surface 5 with the bearing surfaces 5 of adjacent rack sections 2A bearing continuously upon one another.

The relationship between the bearing surfaces 5 of adjacent rack sections 2A is more fully illustrated in the enlarged view of FIG. 3. In the preferred embodiment, in addition to the bearing surfaces 5 on the end faces of the discrete rack sections 2A, the end faces are further formed with alternating end face projections 7 and end face recesses 8. The end faces of the rack sections 2A above and below the bearing surfaces 5 diverge inwardly, forming diverging portions 9, such portions 9 being noncontinuous between adjacent rack sections 2A. Because portions 9 of adjacent rack sections 2A diverge from one another, limited relative longitudinal movement between adjacent rack sections 2A is permitted. Positioned at the top portion of each rack section 2a is a bead 10 running lengthwise throughout the length of each rack section 2A operative to guide the winning machine.

Also illustrated in the enlarged view of FIG. 3 is a toggle which connects adjacent rack sections 2A. Toggle 4 is comprised of spindle 11 interconnecting enlarged end portions 12. The mid-portion of spindle 11 includes a central portion thereof having an increased diameter. The enlarged ends 12 of toggle 4 are positioned within cavities 13 located within the body of the rack sections 2A. The dimensions of the cavities 13 substantially correspond to the outer dimensions of the enlarged ends 12, but are slightly larger in the vertical and horizontal directions to allow limited vertical and horizontal movement of the toggle 4. Positioned at each end portion of the enlarged end 12 of toggle 4, and extending outwardly therefrom, are protuberances 14. As illustrated in FIG. 3, and also in the sectional view of FIG. 4, protuberances 14 engage with arcuate portions 15 of a retaining member 17. Retaining member 17 is connected by screw 16 to the rack sections 2A. Contact between toggle 4 and a rack section 2A is thereby permitted at the end points of the protuberances 14 and about the enlarged end portions 12, particularly at those locations of toggle surface 18 which are curved. The dimensions of toggle's enlarged ends 12 are determined by an arc of a circle with a center of curvature disposed in the horizontal symmetry plane Z of the toggle 4.

When the face conveyor containing the plurality of trough sections 1A, a plurality of rack sections 2A, and a plurality of track sections 3A are all positioned end-to-end along a mine wall, and the toggles 4 interconnect adjacent rack sections 2A, the discrete rack sections 2A are maintained in a fixed longitudinal relationship. Because the discrete rack sections are fixedly connected to an associated trough section 1A, and because the lengths of rack sections 2A are slightly greater than the lengths of the trough sections 1A, a separation distance X is maintained between adjacent ones of the trough sections. A drum cutter mining machine may then be positioned so as to advance along the rack sections 2A by meshing engagement between a drive wheel of the drum cutter and rack pins 6.

During advancing of the mining machine, considerable forces are exerted upon the rack sections 2A. As the mining machine advances from one rack section 2A to another section 2A, contiguous bearing surfaces 5 of adjacent rack sections 2A, and the end face projections 7 and corresponding end-face recess 8 function to take up the transverse forces exerted by the mining machine and transmit these forces to adjacent rack sections 2A. Because the diverging portions 9 of the end faces of the rack sections 2A diverge, relative vertical movement is allowed between adjacent rack sections 2A in the even that the mine floor is uneven. Longitudinal forces exerted upon the rack sections 2A are absorbed and transmitted by the toggle 4 at surface 18 in addition to the force absorbed by bearing surfaces 5 of the rack segments 2A. In this manner, then, longitudinal and transverse forces are absorbed and transmitted from rack section to rack section without any relative longitudinal movement between adjacent rack segments, while, at the same time, limited vertical and horizontal movement permitting between adjacent rack sections 2A.

While the present invention has been described in connection with the preferred embodiment illustrated in the various figures, it is to be understood that other similar embodiments may be used or modifications and additions may be made to the described embodiment for performing the same function of the present invention without deviating therefrom. Therefore, the present invention should not be limited to any single embodiment but rather construed in breadth and scope in accordance with the recitation of the appended claims.

What we claim is:

1. Apparatus to limit horizontal flexing of face conveyor and allow movement of an underground mining machine therealong, said apparatus including the combination of:
   a face conveyor including trough conveyor sections arranged end-to-end at a predetermined spacing;
   a toothed rack including rack sections abutting end-to-end and each section having a length corresponding approximately to the length of one of said trough conveyor sections retained for support thereby; and connecting means interconnecting abutting ones of said rack sections without clearance therebetween for receiving forces of advancing movement of the mining machine while retaining conveyor sections connected to such rack sections at said predetermined spacing and thereby limit horizontal flexibility of trough conveyor sections to a predetermined amount.

2. The rack assembly of claim 1 wherein the length of each of said rack sections is greater than the length of a trough section associated therewith, thereby allowing each rack section to extend beyond the ends of the associated trough section, and thereby maintaining adjacent ones of the trough sections at a predetermined spacing.

3. The rack assembly of claim 1 wherein said connecting means includes toggles having a spindle portion and enlarged end portions at opposing ends thereof, said enlarged end portions being positioned within cavities of the rack sections to thereby connect adjacent rack sections.

4. The rack assembly of claim 3 wherein said cavities in the rack sections are of dimensions allowing limited vertical movement of the toggles and preventing longitudinal movement of the toggles.

5. The rack assembly of claim 4 wherein the spindle portions of the toggles includes longitudinal central portions of increased thickness.

6. The rack assembly of claim 5 wherein surfaces of the enlarged end portions of the toggles which receive longitudinal forces during movement of the winning machine are curved and lie on a common circle arc having a center of curvature disposed in a horizontal plane of symmetry of the toggle.

7. The rack assembly according to claim 6 further including protuberances extending from the ends of the enlarged end portions and retaining elements releasably connected to the rack sections wherein said protuberances engage with said retaining element.

8. The rack assembly of claim 1 wherein said rack section includes a spaced apart transverse rack pins, and wherein the end faces of the rack sections include bearing surfaces in the plane of the rack pins, said bearing surfaces of adjacent rack sections bearing contiguously upon one another, said rack end faces further including other end surfaces diverging upwardly and downwardly from said bearing surfaces for limited vertical flexing of adjacent rack sections and conveyor section relative to one another.

9. The rack assembly of claim 1 wherein said rack sections include spaced apart transverse rack pins, and wherein the end faces of adjacent rack sections further include alternating end-face projections and end-face recesses to allow toothing engagement between contiguous end faces.

* * * * *